L. Eames,
Wood Chisel.
Nº 27,782.   Patented Apr. 10, 1860.
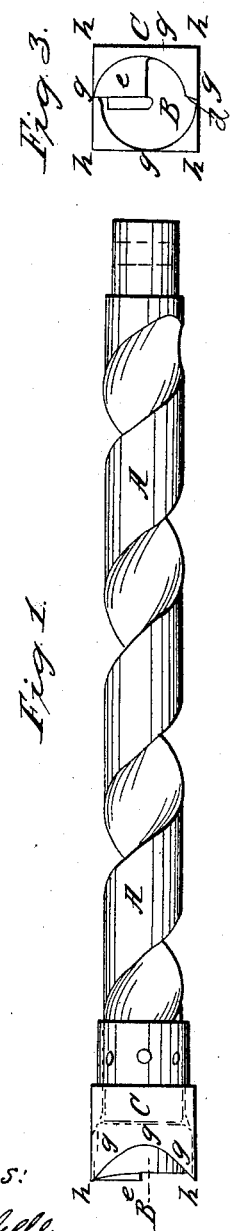
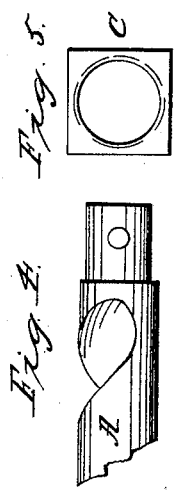
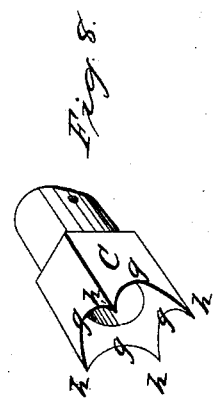
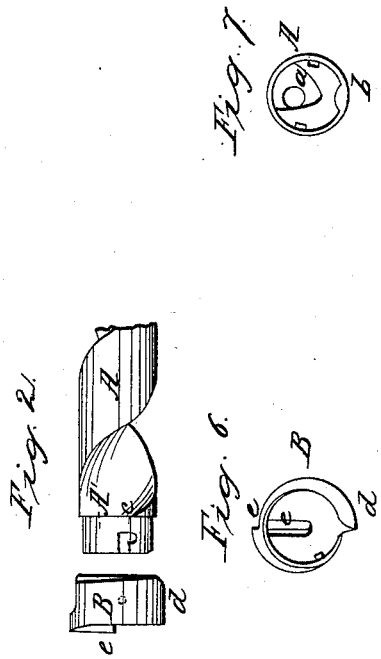
Witnesses:
R. Y. Campbell
M. Livingston
Inventor:
Lovett Eames

UNITED STATES PATENT OFFICE.

LOVETT EAMES, OF KALAMAZOO, MICHIGAN.

MORTISING-TOOL.

Specification of Letters Patent No. 27,782, dated April 10, 1860.

*To all whom it may concern:*

Be it known that I, LOVETT EAMES, of Kalamazoo, in the county of Kalamazoo and State of Michigan, have invented a new, useful, and Improved Mortising-Tool; and I do hereby declare that the following is a full, clear, and exact description thereof, reference being had to the accompanying drawings, forming a part of this specification, in which—

Figure 1 represents a side view of the single twist auger, and cap of the chisel on the end of the same, the shank or body of the chisel being removed from the auger. Fig. 2 exhibits the end of the auger with its cap removed. Fig. 3 is an end view of the auger and chisel showing the face and side lips of the auger point or cap. Figs. 4 and 5 represent the back end of the auger and that of the chisel respectively. Fig. 6 shows the inside of the auger point or cap. Fig. 7 is a view of the end of the auger showing the opening or throat in its end for receiving the chips cut by the radial or face cutting lip on the end of the auger point or cap. Fig. 8 is a perspective view of the cutting end of the chisel.

Similar letters of reference indicate corresponding parts in the several figures.

The object of this invention and improvement in mortising tools, where a hollow chisel and auger are combined, is to so form and combine the cutting with the feeding of the chips; that there will be less liability of the throat or throats of the cutters and the worm of the auger becoming choked or clogged up with chips; and to construct the end of the chisel in such a way that the diameter of the hole formed in the work by the cap or cutter on the end of the auger, will be equal to the width of the chisel succeeding the cutters; and in so forming the cutting end of the chisel that the entire cutting edge may be sharpened at the same time with a conical whet-stone revolving in a brace or otherwise, thus enabling the end of the chisel to be made of hardened steel, while the body or shank of the same may be made of softer metal.

For this purpose my invention consists in the use of a hollow chisel with three, four, or more sides, with either regular or irregular sides or angles, through which is passed an auger with a single twist, having on its end a detachable steel cap with one or more faces or radial cutting lips, and on its side a parallel cutting lip or lips, the throats of which communicate with the worm or spiral groove of the auger which groove directs or conducts the chips to the rear or back end of the auger where they are discharged; here the point of invention consists in combining with the cutting lips a scalloped and flaring-mouthed chisel, the inner surfaces of which mouth are beveled toward the axis of motion of the auger, whereby the chisel may be driven into the work with greater ease and rapidity, and the chisel will have a firmer hold on the work in the commencement of boring. The edges of the side cutters can also be brought nearer or in a plane with the sides of the auger, and the chisel will have less work to perform.

The cap on the end of the auger is to be made of hardened steel and attached to the end of the auger in such a manner that it may be readily attached or detached, or so that it may be permanently secured to the auger when a forward and reverse motion of the auger is required, all as will be hereinafter described and represented.

To enable those skilled in the art to understand my invention I will proceed to describe its construction and operation.

In the drawings, A represents an auger having a single twist, which is preferable for use in my improvement, especially for working in hard wood. The spiral groove of this auger shaft terminates at the forward or cutting end in a cylindrical portion, A′, in the end of which is a V-shaped opening, $a$, which communicates directly with the center of the worm or spiral groove; and on the side of this portion, A′, is a recess, $b$, formed which also opens into the worm, as clearly shown by Fig. 7. This end portion is solid with the auger shaft and it receives a steel cap, B, Figs. 2, 3 and 6, which being placed over it may be secured by a bayonet-fastening, $c$, so that it can be readily removed and another secured in its stead, but for augers which are to receive a forward and reverse rotary motion the cap, B, must be locked by a through-pin, or by any other suitable permanent fastening. The cutting part or parts of this detachable steel cap, B, are lips, $e$, $d$, one ($e$,) projecting from the end of the cap, and arranged radially with its axis of motion, which feeds the chips back through its throat and through the V-shaped opening, $a$, into the worm of the auger, and the other lettered, $d$, which is arranged on the side of the cap and parallel to its axis, or at right angles to cutter, e, discharges the chips also in the worm simultaneously with the feed of the cutter, e. These two lips, e and d, are so made and situated in the cap, B, that the radius lip, e, will cut the whole diameter of the auger, or nearly so, from the back of the hole, and the other lip, d, will cut and discharge the wood or chips gathered in from the corners by the chisel, C, so as to prevent choking and so that each lip shall supply its own throat, and deliver in the worm of the auger nearly an equal portion of the chips cut, as fast as the cutting proceeds, the throats or openings formed in the end of the chisel, as above described, materially assist in conducting away the chips from the cutting lips, at the same time the timber forming a bridge between the openings, a and b, serves an important office, viz: to give strength to the parts and to conduct the chips well back from the throats of the cutting lips before they enter the worm or common channel, this will prevent the chips from choking up in the end of the auger and will cause them to be conducted back into the body of the worm with great rapidity.

This auger is incased by a hollow chisel, C, the shank of which (not shown) serves as a conducting tube for conveying away the chips, and the end of which will act as a chisel for mortising out a rectangular, triangular, or multangular hole with regular, or irregular sides or angular, either curved fluted or otherwise. This chisel of whatever size or shape has a round bore the size of the auger it is to receive, and its cutting end, C, should be made of steel of any degree of hardness required, and in order to have this end cutting piece of a suitable hardness I so form its mouth that the entire cutting edges and points may be sharpened at once, and by a conical whetstone placed in a brace to receive a rotary motion. For this purpose the cutting edges, g, are scalloped out, as clearly shown by Figs. 1 and 8, leaving the corners or angles, h, most prominent and the sides as produced by reaming out the hollow of the chisel with a bell-shaped conical bur, thus leaving the entire flaring inner surface of the chisel perfectly circular. This peculiar construction of the cutting end of the chisel, besides possessing the advantage of facility in sharpening, it has another advantage over the square-surfaced chisels, in that by scalloping the cutting edges between the corners the edges make a draw-cut which requires less power to drive the chisel.

The points of the chisel are slightly in advance of the auger and are held firmly in place by a suitable stiff frame, and there being no screw on the point of the augur to cause it to swerve or deviate from a true course in the event of any inequality in the timber, the chisel will not vary at all from a straight line, even though the timber be knotty or curled, and of the hardest kind, a second and third series of mortises may be cut perfectly true adjoining the first and making continuous smooth sides.

By removing the chisel from the auger the auger can be used with advantage in any properly constructed boring machine.

This pointed chisel with the auger will serve a very useful purpose for beating a mortise in a piece of timber in an oblique or diagonal line with its face, as the points of the chisel will strike the wood first and hold it firmly in place while the boring proceeds.

I do not claim anything in relation to the twist or screw of the auger, or using angular or hollow chisels to form the corners of the mortise for I am aware that the hollow auger and chisel have been combined in a variety of ways, but

Having thus described my invention, what I do claim as new, and desire to secure by Letters Patent, is:—

In combination with the parallel lip, d, on the side of the auger cap the hollow conical mouthed, and scalloped chisel point whereby a hole the full width of the chisel may be bored by the auger, and the cuttings made by the auger will be directed toward the center of the auger, as described.

LOVETT EAMES.

Witnesses:
R. T. CAMPBELL,
M. M. LIVINGSTON.